Feb. 7, 1967   V. DAVIDOVIC   3,302,397
REGENERATIVELY COOLED GAS TURBINES
Filed Aug. 25, 1964   9 Sheets-Sheet 1

Fig.1.

INVENTOR.
VLASTIMIR DAVIDOVIC
BY Robert W. Beach
ATTORNEY

Feb. 7, 1967    V. DAVIDOVIC    3,302,397
REGENERATIVELY COOLED GAS TURBINES
Filed Aug. 25, 1964    9 Sheets-Sheet 2

INVENTOR.
VLASTIMIR DAVIDOVIC
BY
Robert W. Beach
ATTORNEY

INVENTOR.
VLASTIMIR DAVIDOVIC
BY Robert W. Beach
ATTORNEY

INVENTOR.
VLASTIMIR DAVIDOVIC
BY
Robert W. Beach
ATTORNEY

Feb. 7, 1967  V. DAVIDOVIC  3,302,397
REGENERATIVELY COOLED GAS TURBINES
Filed Aug. 25, 1964   9 Sheets-Sheet 9

INVENTOR.
VLASTIMIR DAVIDOVIC
BY
Robert W. Beach
ATTORNEY

United States Patent Office 3,302,397
Patented Feb. 7, 1967

3,302,397
REGENERATIVELY COOLED GAS TURBINES
Vlastimir Davidovic, 1921 12th Ave. S.,
Seattle, Wash. 98144
Filed Aug. 25, 1964, Ser. No. 391,897
6 Claims. (Cl. 60—39.16)

This application is a continuation-in-part of the application of U.S. Patent 3,233,866 for Cooled Gas Turbine. It relates to a gas turbine engine, and particularly to such a gas turbine engine which is cooled for the purpose of allowing less expensive materials to be used for parts which would otherwise be heated too highly, and to increase the thermal efficiency of the gas turbine engine.

A principal object is to utilize compressed air for cooling the turbine discs and both the rotary blades and the stationary blades of the turbine or turbines to enable these blades to be made of less expensive material than would otherwise be required, and to supply to the combustion chamber the air heated by such cooling. In this operation it is also an object to utilize virtually all of the air supplied to the combustion chamber for such turbine blade cooling purposes.

For increasing the cooling ability of the compressed air, it is an object to precool such air by the use of fluid flowing in heat exchange relationship to the compressed air, and such cooling fluid can be either air or liquid coolant.

In accomplishing the foregoing objects it is an object to utilize light, simple, efficient and compact construction.

In cooling the last turbine stage it is an object, where desirable, to decrease the temperature to as low a value as practical for the purpose of reducing the operating loss of the gas turbine and increasing its efficiency, and such cooling can be effected by spraying liquid coolant into the airstream passing to the combustion chamber. Liquid of detergent character may be sprayed into the blade cooling airstream periodically, if desired, for the purpose of cleaning the passages through the hollow blades.

Another object is to improve the radial flow through hollow stationary blades of a turbine engine, and to coordinate the flow in parallel through hollow stationary and hollow rotating blades of the turbine. Air is impelled through both the stationary and rotary blades by being discharged from the rotating hollow disc portion of the impeller. Also by locating the discharge passages from the stationary blades and from the moving blades in adjacent relationship, air discharged from the rotating turbine blades, which is accelerated by centrifugal force during such passage, will produce an aspirating effect on the air flowing through the adjacent hollow stationary blades and increase its velocity of flow.

In providing flow of cooling air through the hollow rotating blades of the turbine it is also an object to reduce leakage of blade-cooling air into the path of the turbine propelling exhaust gas.

A further object is to provide an economical turbine blade structure for forming hollow rotary turbine blades through which cooling air can flow effectively.

An additional object is to increase the effectiveness of cooling the compressed air by passing it between two bodies of circulating cooling fluid. Also, if two compressors are utilized, it is an object to cool the air compressed by the second-stage compressor if it is advantageous to increase the turbine blade-cooling ability of the compressed air.

Another object is to add such compressed air to the combustion gas at the outlet of the combustion chamber to provide maximum combustion gas pressure and control turbine inlet temperature.

It is an object to be able to supply combustion gas to the turbine at a higher temperature than would otherwise be permissible for turbine blades made of a particular material, which increases the efficiency of the gas turbine operation, because of the internal cooling of both the rotary and stationary turbine blades.

It is also an object to increase the efficiency of such a gas turbine further by incorporating in the exhaust gas duct an arrangement for extracting a greater amount of heat from the exhaust gas, and utilizing such heat for increasing the temperature of air or air and fuel supplied to the combustion chamber.

A gas turbine engine having either a centrifugal compressor or an axial compressor, or compressors in combination can be used. Two turbines may be employed, both the stationary and rotating blades of which are hollow having passages extending radially through them and opening at both the inner and outer ends of the blades, and air compressed by such compressor or compressors is conducted through the turbine discs and the stationary and rotating turbine blades, both to cool the discs and the blades and to heat the air. Preferably such compressed air, either during or after the compressing operation, moves through a passage in heat-exchange relationship with a cooling fluid chamber, which preferably is in the form of an envelope encircling the compressed air passage. Cooling fluid can also be supplied inwardly of the compressed air passage, and either or both of the cooling fluid chambers and the compressed air passage can be provided with fins or ribs to increase the effectiveness of heat exchange. To provide a large volume of cooling airflow through the moving and stationary blades of the turbine or turbines, such blades are made of sheet material, which can be forged, cast or stamped into the desired shape and assembled. The edges of the turbine rotors are formed as flanges fitting into grooves to provide a sealing labyrinth, and the flange edges are formed as blowers to impel outward air tending to flow into the path of combustion gas through the turbine. Jets are provided for discharge of supplemental liquid coolant or liquid detergent, or both, to the cooling air. A heat exchanger may be provided between the turbines and the discharge end of the exhaust pipe for transfer of further heat from the exhaust gas to preheat combustion air.

FIGURE 10 is a side elevation of the central portion of the gas turbine engine of which FIGURE 8 shows a compressor section, parts being broken away.

Figure 1:
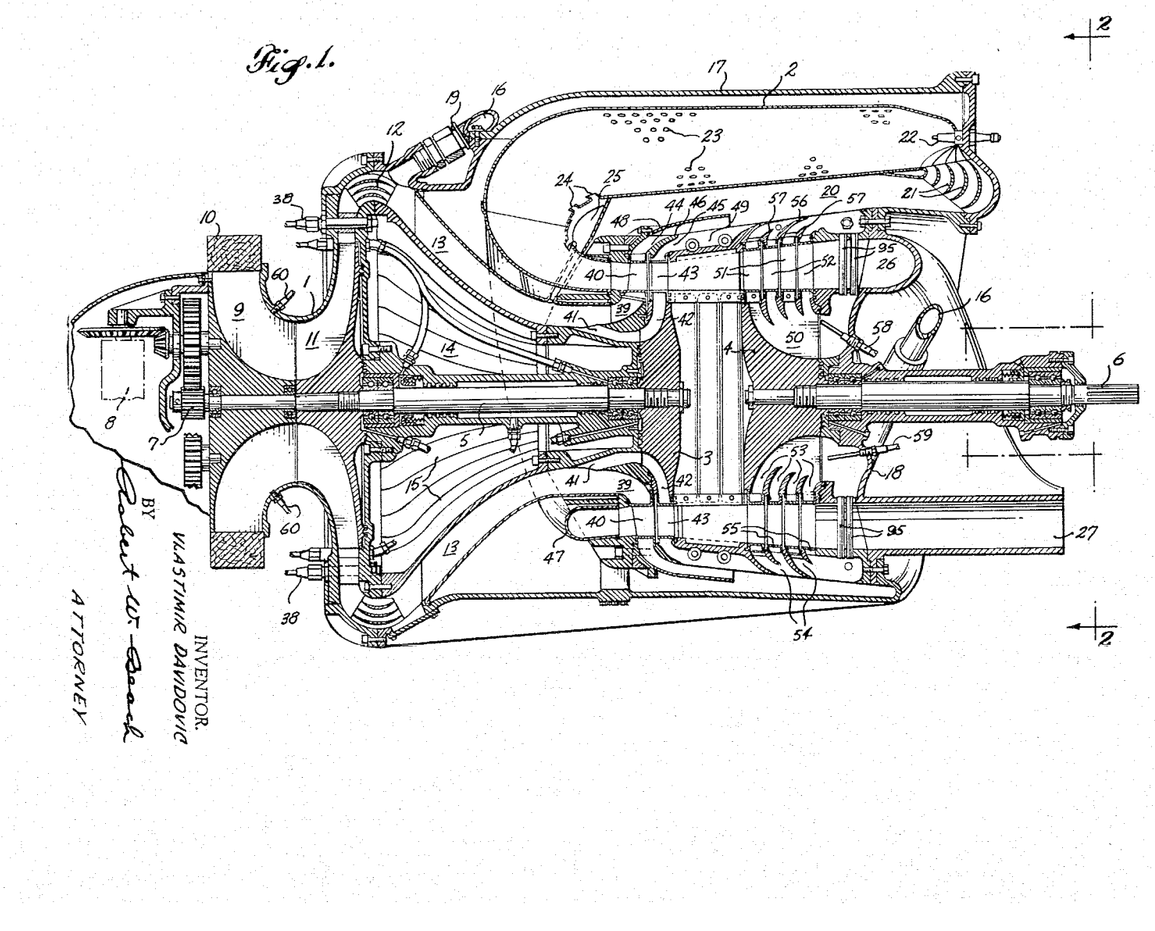
FIGURE 1 is a longitudinal section through one type of gas turbine engine construction provided with the invention.
Figure 2:
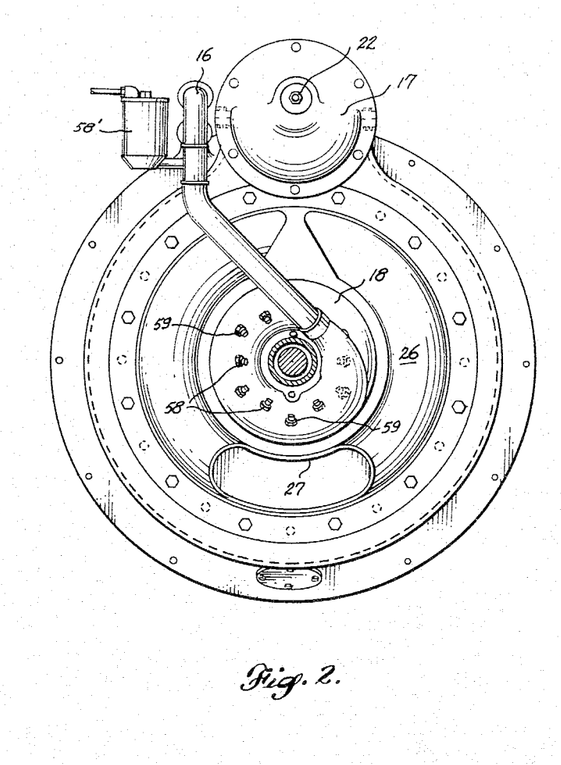
FIGURE 2 is an end elevation taken on line 2—2 of FIGURE 1.

The gas turbine engine shown in FIGURES 1 and 2 includes a compressor 1, shown to be of the centrifugal type which supplies air under pressure to a combustion chamber 2, the combustion gas from which drives the compressor turbine 3 and the power turbine 4. The compressor turbine is connected to the compressor by a drive shaft 5, and the power turbine 4 drives the output shaft 6. This gas turbine engine may be used either as a stationary power plant or to drive a vehicle such as an automotive vehicle, a boat, or even an airplane. For any of these uses the shaft 5 can be extended beyond the compressor 1 to carry a gear 7 which may be suitably connected to drive various accessories 8, such as magnetos, generators and pumps.

Air to be compressed is supplied to the compressor 1 through stationary inlet passages 9, the entrances to which may be covered by suitable filter material 10. The impeller 11 of the compressor by its rotation effects compression of the air flowing into the engine in a pressure ratio which, for example, may be approximately four to one. The outwardly flowing air discharged from the compressor is redirected by vanes 12 into the inwardly converging passages 13, which extend to the turbine 3. The inner walls of these passages or annular cross section passage are cooled by coolant in the coolant container 14. These walls may have inwardly projecting fins 15 to facilitate transfer of heat from the compressed air to the coolant. Such coolant is in liquid form, and may be fuel used to power the gas turbine engine.

Air from the passages 13 is used to cool the compressor turbine 3, and then flows on toward the inlet to the combustion chamber 2. Part of the air compressed by the compressor 1 is bled off through a branch conduit 16 which extends alongside the casing 17 enclosing the combustion chamber to extend to the opposite end of the turbine casing for cooling the rearward power turbine 4, while the balance of the compressed air flows through the passages 13. Such conduit is connected to an inner housing 18 alongside the turbine 4 by a scroll casing to direct the air circumferentially within such housing. From this housing the air flows in cooling relationship to the power turbine 4 to the passage 20, where it merges with air from the passages 13 which has cooled the turbine 3. The compressed air flows from the passage 20 through the passages between the redirecting vanes 21 into the inlet end of the combustion chamber 2.

Fuel is supplied to the combustion chamber 2 in atomized form by the nozzle 22 and supplemental air may flow into the combustion chamber in conventional fashion through apertures 23 in the combustion chamber wall.

The discharge end of the combustion chamber is formed as a return bend, and the internally convex wall of this bend has in it passages 24 through which air can flow into the outlet end of the combustion chamber from a duct 25 connected to the passage 13, into which the compressed air is discharged from the compressor 1. Such duct receives compressed air which has been cooled by the coolant in the cooling container 14, so that such addition of air tends to reduce somewhat the temperature of the combustion gas and insures that the pressure of the combustion gas discharged from the combustion chamber is substantially equal to the pressure of the air discharged from the compressor 1. The combustion gas then flows through the compressor turbine 3 and the power turbine 4 to drive their rotors, and finally is discharged through the exhaust manifold 26 and the tail pipe 27.

Figure 3:
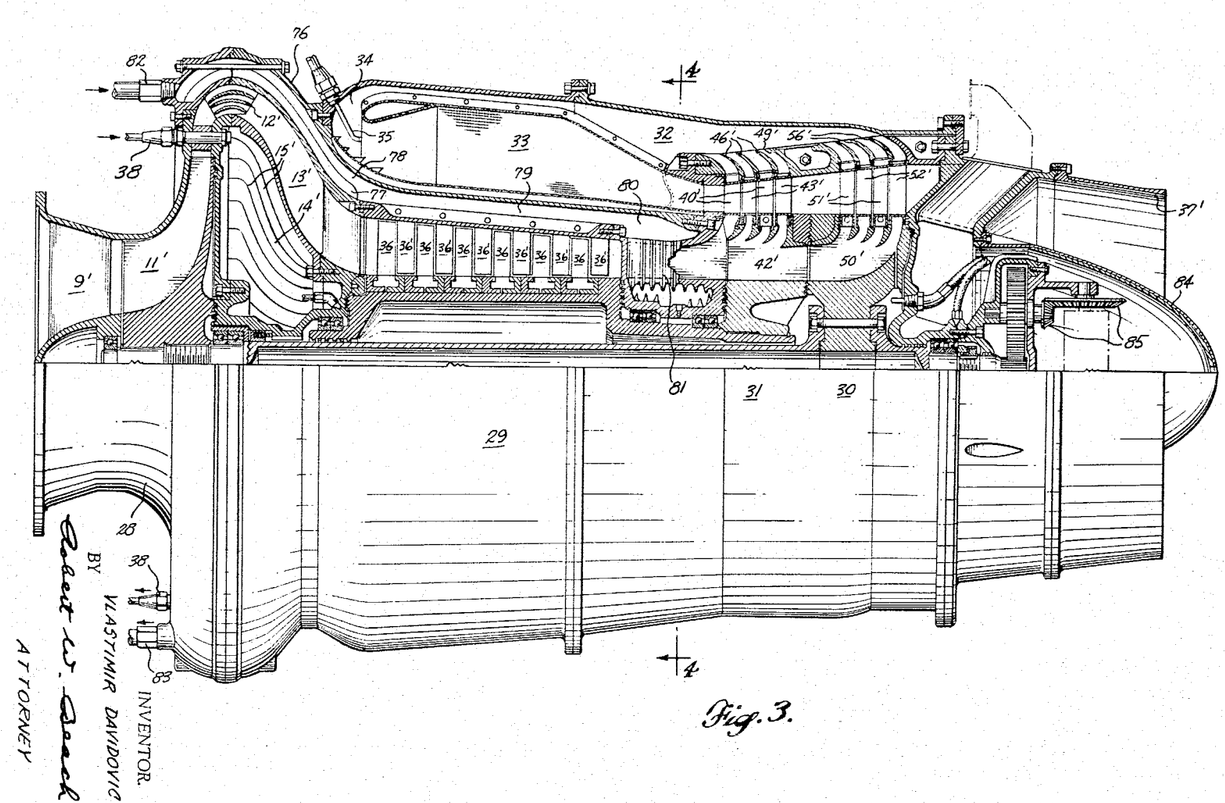
FIGURE 3 is a side elevation with parts broken away of another type of gas turbine engine, parts being broken away.
Figure 4:
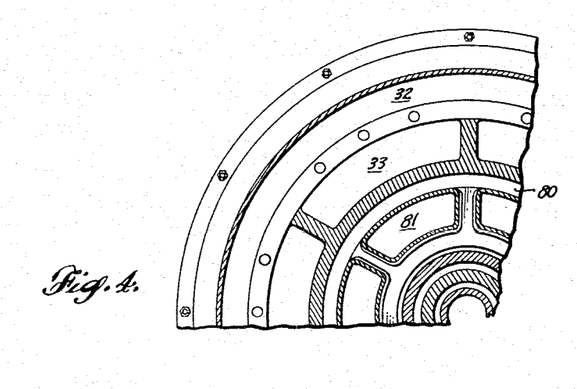
FIGURE 4 is a partial transverse section on line 4—4 of FIGURE 3.

Another representative type of gas turbine engine in which this invention is used is shown in FIGURES 3 and 4. This gas turbine engine has two compressors 28 and 29 arranged in series, which are driven respectively by two compressor turbines including the low-pressure compressor turbine 30 driving the compressor 28 and the high-pressure compressor turbine 31 driving the second compressor 29. The first compressor 28 has a centrifugal impeller 11′ which compresses air flowing into the inlet 9′ in the pressure ratio of approximately four to one. The air thus compressed is redirected by vanes 12′ into a radially converging annular passage 13′ which may be divided into several passages by longitudinally-extending radial vanes, if desired.

From the passage 13′ the initially compressed air flows into the intake of the compressor 29, which is illustrated as being an axial compressor, the impeller of which has several rows of rotating blades 36 alternating with stationary blades 36′. The compression ratio of such a compressor may be from four to one to ten to one, a representative compressor having a compression ratio of eight to one. The mass of compressed air delivered by the second compressor 29 will be greater than it otherwise would be because the air discharged from the compressor 28 is cooled substantially before it enters the high-pressure compressor 29. The air discharged from such high-pressure compressor then flows to the high-speed turbine 31 and the low-speed turbine 30 to cool them.

Figure 12:
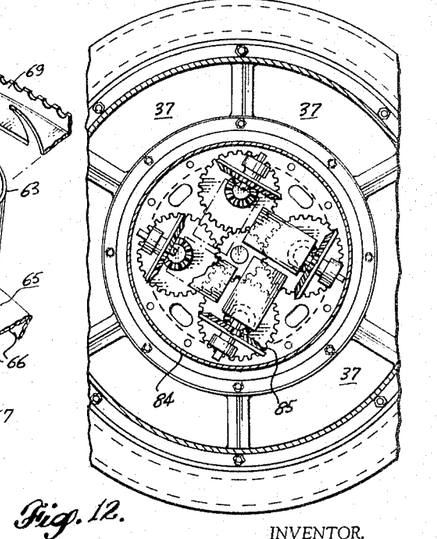
FIGURE 12 is a transverse section through the aft portion of a gas turbine engine, which may be of the type shown either in FIGURE 3 or in FIGURES 8 and 10, with parts broken away.

From the turbines 31 and 30 the compressed air flows through an annular passage 32 to the annular combustion chamber 33 by way of the intake 34. Into this intake fuel is projected in atomized form from the nozzle 35 to mix with the compressed air. The combustion chamber walls are perforated so that air may enter low pressure portions of the combustion chamber directly from the passage 32, instead of all the air entering through the entrance 34. The combustion gas from this combustion chamber flows first through the high speed turbine 31 and then through the low speed turbine 30 to drive their rotors, and is discharged through the passages 37 shown in FIGURE 12 and the tail pipe 37′.

The provision for cooling the air compressed by the compressor or compressors and for using such compressed air to cool the blades of the turbine or turbines, according to the present invention can be accomplished in different ways and is illustrated in connection with the two representative types of gas turbine described above in connection with FIGURES 1 and 3. The cooling arrangement includes two principal features, first that of employing air compressed by one or more compressors to cool directly the blades of a turbine or turbines, and preferably both the stationary blades and the rotating blades of such turbine by flow through the hollow interior of such blades, and second, in order to increase the efficiency of the gas turbine generally and to increase the effectiveness of such turbine blade cooling, to cool such compressed air after it has been compressed initially, using either air or liquid coolant, and if it is compressed further by a second compressor, to cool such air further during such second compression.

In the gas turbine engine of FIGURE 1 the air compressed by the centrifugal compressor 1 is cooled as it flows through the converging passage 13 by transference of heat to coolant in the coolant container 14, which is circulated through such container by suitable connections 38, by which coolant may be supplied to or withdrawn from the coolant container. Preferably such coolant is fuel supplied through the nozzle 22 to the combustion chamber, and such fuel therefore constitutes a heat sink. Because cooling of the compressed air results in reduction of the volume of compressed air to some extent if its pressure is maintained constant, the passage 13 is shown as contracting in cross-sectional area, although its radial width should be increased as its circumferential extent decreases as may be necessary to prevent the necessity of the air pressure being increased as it flows through the passage 13, because under such circumstances the compressed air would not flow through the passage readily, but such air would create an excessive back pressure on the compressor 1.

The compressed air thus cooled is divided as it reaches the compressor turbine 3 into a portion flowing through passages 39 which lead into passages extending radially through the stationary blades 40 of the turbine 3, and a portion flowing through passages 41 which lead into passages 42 within the rotor of the turbine 3 which curve from an axial direction into a radially outward direction to supply air to the radially extending passages through the interiors of the hollow rotary blades 43. From the stationary blades 40 the cooling air is discharged through passages 44 which are located adjacent to passages 45 in the stationary portion of the gas turbine body which surrounds the rotor 3. The passages 44 and 45 are separated by an annular divider 46.

Combustion gas discharged from the combustion chamber 2 passes through the turbine supply manifold 47 contracting circumferentially in volume toward the side of the gas turbine opposite the combustion chamber 2. From such manifold the combustion gas flows axially between the stationary blades 49 of the turbine 3, and then between the rotary blades 43 of the turbine rotor to exert a circumferentially directed rotating force on the rotor by the reaction of the combustion gas on these blades. The compressed air flowing radially through the turbine blades serves the dual purpose of keeping the temperature of such blades sufficiently low so that economical materials can be used for the construction of the blades and removing heat from the combustion gas for reheating the compressed air, which heat would otherwise largely be wasted in the discharge from the tail pipe 27 of combustion gas at comparatively high temperature.

An important feature of this turbine construction is the cooperative action between the compressed air flowing through the interior of the rotating blades and the compressed air flowing through the interior of the stationary turbine blades. During passage from the compressor 1 shown in FIGURE 1 through the rotating blades 43 of the compressor turbine 3 in a radial direction the flow of the compressed air is accelerated by centrifugal action, and such increased velocity is maintained as the air discharged from the rotating turbine blades passes through the passages 45 adjacent to the passages 44. Since the blades 40 are stationary the flow of compressed air through their interiors normally would be produced only by the difference in pressure of the air between the passage 13 and the passage 20. The accelerated flow of air through the passages 45 produces an aspirating effect on the air in passages 44, however, so that the flow through such passages is accelerated. This effect is enhanced and the direction of airflow discharged from the passages 44 and 45 is controlled by provision of an annular shield 48 extending over the discharge openings of the passages 44 and 45, and directed toward the redirecting vanes 21. Rotational movement of compressed air discharged from the passages through the rotating blades 43 is deterred by providing axially extending dividers 49 intersecting the annular divider 46 to form an annular grid.

All of the compressed air conveyed by the passage or passages 13 flows through the hollow stationary blades and the hollow rotary blades of compressor turbine 3, as shown in FIGURE 1. The hollow stationary blades and the hollow rotary blades of power turbine 4 are cooled by air passing through the branch conduit 16 leading from the compressor 1. Such conduit can be made as large as required to supply an adequate amount of compressed cooling air to the annular casing 18 shown in FIGURES 1 and 2 which distributes the air to passages 50 within the rotor of the power turbine. Such power turbine is illustrated as including two sets of stationary blades 51 and two sets of rotary blades 52. The passages 50 lead to radially discharging passages 53 through which the compressed cooling air is supplied in radial directions through the radial passages extending through the hollow fixed blades 51 and the radial passages through the interiors of the hollow rotating blades 52.

Air is discharged from the interiors of the fixed turbine blades 51 through passages 54, which are located alongside passages 55, respectively, through which air is discharged from the interiors of the rotating turbine blades 52. Each pair of passages 54 and 55 is separated from the other pair of such passages by a relatively wide annular divider 56, and the passages 54 and 55 of each pair are separated by a relatively narrow annular divider 57. All of these annular dividers are intersected by the axially extending dividers 49 which deter rotation of the air passing through the radial passages within the rotating turbine blades 52. The compressed air flowing through such rotating turbine blades is accelerated and maintenance of the increased velocity of such air flowing through the passages 55 produces an aspirating effect on the air flowing through the passages 54 from the interiors of the stationary blades 51 to facilitate the flow through such stationary blades.

The streams of air emerging from the passages 44, 45, 54 and 55 of the gridwork formed by the radial and axial dividers commingle in the annular chamber 20 and the reheated air flows between the redirecting vanes 21 into the combustion chamber 2. Reheating of the air passing through the internal passages of the stationary turbine blades 51 and the rotary turbine blades 52, as in the case of power turbine 4, serves the dual purpose of cooling the walls of the turbine blades to maintain their temperature sufficiently low so that economical material can be used for such blades, and heat extracted from the combustion gas is utilized at a location adjacent to the inlet to the combustion chamber to reheat the compressed air provided to support combustion instead of such heat being wasted by discharging the exhaust gas through the tail pipe 27 at a higher temperature. The size of the passages for the compressed air through the gas turbine in the manner described should be selected carefully to provide proper flow of air consistent with the heat extracted from it and subsequently supplied to it during its passage, bearing in mind that most of the air moving from the compressor 1 to the combustion chamber 2 passes through internal turbine blade passages.

An example of the temperature gradients of the compressed air and combustion gas flowing through the turbine will illustrate the heat exchange action of the structure described. At the discharge of the compressor 1 the temperature of the compressed air may be in the range of 350° to 400° F., depending upon the temperature of the air supplied to the compressor, and the pressure ratio of the compressor, but it is assumed that the compressor 1 is driven by turbine 3 at approximately its normal speed so that the pressure of the air at the compressor discharge would be 55 to 60 pounds per square inch. As the compressed air passes through the passages 13 and the conduit 16 it is cooled so that as the air reaches the passages through the fixed and rotating blades of both turbines the temperature of the air will be in the range of 250° to 300° F.

The temperature of the combustion gas discharged from the combustion chamber 2 is approximately 1800° F., and its pressure will be approximately 55 pounds per square inch. During flow of the combustion gas through the compressor turbine 3 and the power turbine 4 to the tail pipe 27 the temperature will be reduced to approximately 1150° F. and the pressure will be reduced to 15 to 16 pounds per square inch. The loss of potential energy represented by the reduction in temperature and pressure will principally be transformed into mechanical energy to effect rotation of the turbines by reaction between the fixed blades 40 and rotatable blades 43 of the turbine 3, and the fixed blades 51 and rotatable blades 52 of the turbine 4. In addition a substantial amount of heat removed from the combustion gas is transmitted to the walls of the turbine blades to heat the compressed air passing through the hollow interior of such blades to effect cooling of them. Such heat transfer will increase the temperature of the cooling air in the common air chamber or passage 20 to approximately 400° F. to 450° F.

The cooling effect of the compressed gas flowing through the interior of the hollow stationary and rotary turbine blades will reduce the average wall temperature of these blades to approximately 800° to 900° F. The blades toward the discharge end of the turbine 4 will be of substantially lower temperature. A liquid coolant, such as water or other suitable liquid, may be utilized to supplement the cooling effect of the compressed air flowing through the hollow interior of the blades. For this purpose liquid coolant may be forced by a pump from nozzles 58 arranged in circumferentially spaced relationship around the cooling air supply casing 18 directed into the passage of the last row of the rotating blades of the turbine 4. As the coolant vaporizes from atomized condition it will absorb considerable heat and be carried with the compressed air into the combustion chamber 2. Additionally, all of the air which passes through the cooling passages may be humidified generally by the supply of water or other suitable liquid coolant the supply of which is controlled by a carburetor 58' shown in FIGURE 2 as being carried by and communicating with the cooling compressed air conduit 16.

It may be desirable to supply detergent to the cooling passages through the stationary and rotary turbine blades periodically, and for this purpose additional nozzles 59 may be mounted in the casing 18 in positions alternating with the nozzles 58 and directed to flow into the various passages through the stationary and rotary blades of the turbine 4. Similar detergent-ejecting spray nozzles 60 can be provided to spray detergent into the inlet passages 9 through which atmospheric air enters the centrifugal compressor 1. Control apparatus (not shown) may be provided to effect ejection of detergent from the nozzles 59 and 60 automatically at predetermined intervals, or such detergent may be ejected at will by voluntary control mechanism.

In operation of the gas turbine engine shown in FIGURE 3 at approximately normal speed, if the centrifugal compressor 28 has a compression ratio of approximately four to one, the temperature of the air at the discharge from such compressor would be between 350° F. and 400° F., and the pressure would be between 350° F. and pounds per square inch. During movement of this air through passage 13', between the discharge of compressor 28 and the inlet of axial compressor 29, the air should be cooled to a temperature between 150° and 200° F. by cooling such passage. This cooling is effected by conduction of heat through the walls of the passage and its fins 15' to liquid coolant in the coolant container 14'. If the compression ratio of the axial compressor 29 is four to one, the pressure of the air at the discharge end of this compressor would be between 230 pounds per square inch and 240 pounds per square inch, and the temperature of such air would be in the range of 550° F. to 600° F. The temperature of the air delivered from the axial compressor 29 to the high-speed compressor driving turbine 31 and the low speed compressor driving turbine 30 would be lower than this value if the air is cooled appreciably during its compression by the axial compressor 29.

As in the case of the gas turbine engine shown in FIGURE 1, the mean temperature of the combustion gas discharged from the combustion chamber 33 will be approximately 1800° F., but because of the higher pressure of the compressed air supplied to the combustion chamber the pressure of such combustion gas will be approximately 230 to 235 pounds per square inch. As a result of the transformation of heat and pressure energy of the combustion gas to mechanical energy effected by high-speed rotation of the high-speed turbine 31 and the heating of the air passing through the internal passages in the blades of this turbine, the temperature of the combustion gas at the discharge of such turbine will be approximately 1200° F. and the pressure will be from 125 to 1230 pounds per square inch. The temperature and pressure of the combustion gas will be reduced farther as it flows through the low-speed turbine 30. Such gas discharged through the tail pipe would be cooled to a temperature of 600° F. to 650° F., and the pressure of the combustion gas being discharged will be reduced to a range of 15 to 16 pounds per square inch.

In order to maintain the temperature of the turbine blade walls at an average temperature within the range of 900° F. to 1000° F. the temperature of the cooling air passed through the interior of the turbine blades will be increased drastically, such as from the range of 225° F. to 250° F., mentioned above as the temperature of the air entering the turbine rotor passages to the temperature in the passage or chamber 32 in the range of 800° F. to 900° F. In this chamber the pressure of the compressed air will still be within the range of 230 pounds per square inch to 235 pounds per square inch, at which pressure the air will enter the annular combustion chamber 33 through its reticulated walls and through the primary air passage 34. The thermal efficiency attained would be 40% to 45% and the specific fuel consumption would be 0.31 to 0.35 pound per horsepower hour.

Figure 5:
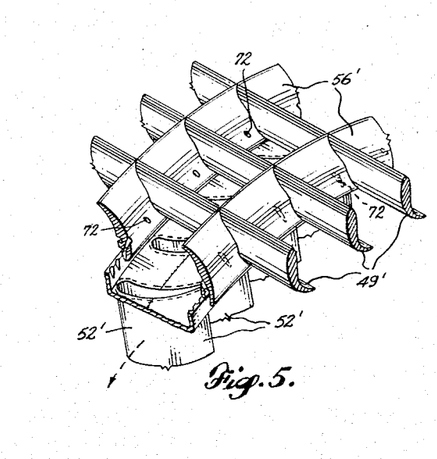
FIGURE 5 is a perspective of part of the internal structure showing turbine blade cooling passage outlets.
Figure 6:
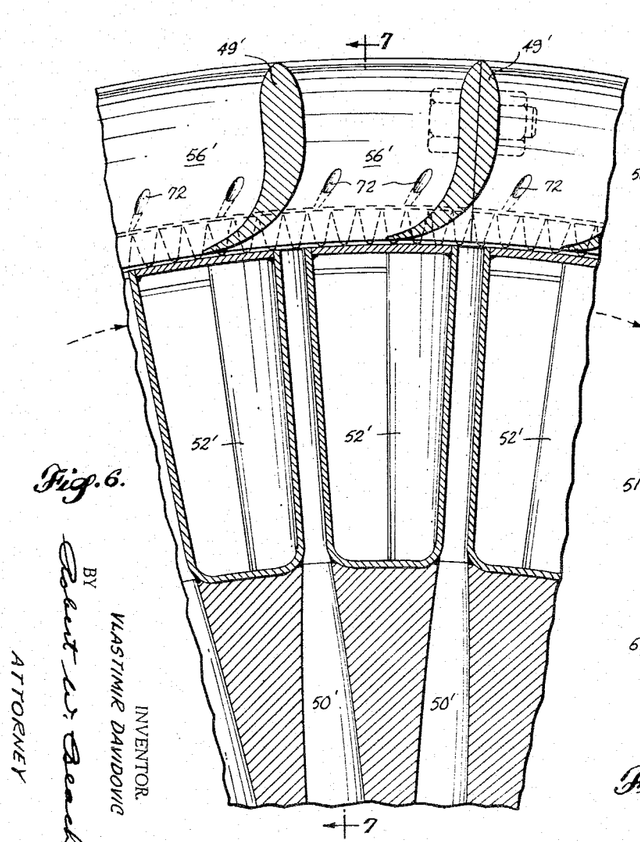
FIGURE 6 is an enlarged transverse section through a portion of a turbine rotor and stator structure taken on line 6—6 of FIGURE 7.
Figure 7:
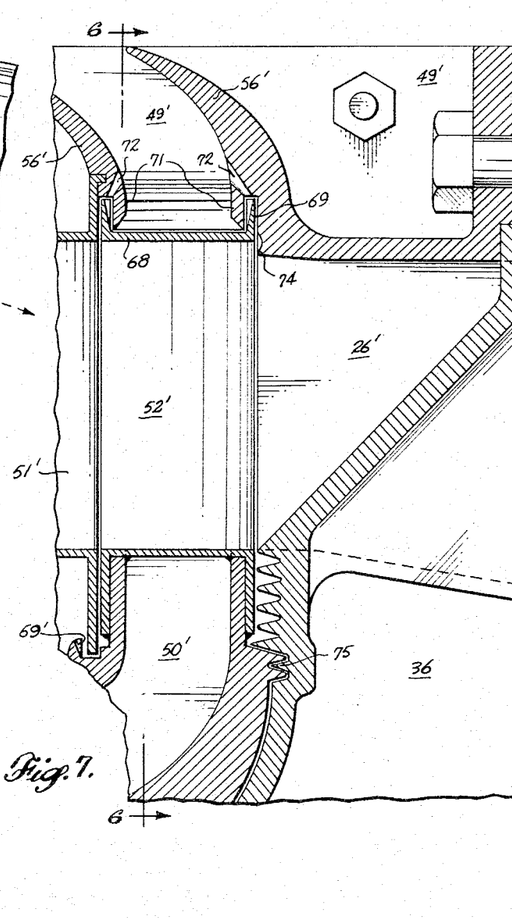
FIGURE 7 is a longitudinal section on line 7—7 of FIGURE 6.

The manner in which flow of compressed air through the hollow stationary and rotary turbine blades effects cooling of the blade walls has been discussed generally in connection with FIGURE 1, but typical turbine rotor structure and associated stator structure is shown in greater detail in FIGURES 5, 6 and 7 of the type utilized in the gas turbine engine of FIGURE 3, but following the same general principles as used in the corresponding structure shown in FIGURE 1. Consequently corresponding parts have for the most part been designated by corresponding numbers primed. In this instance the compressed air supplied to the hollow stationary turbine blades 51' passes through the hollow 50' of the rotor disc so that such air is pumped through such blades by the rotation of the rotor.

In FIGURES 5, 6 and 7 fragmentary portions of the turbine rotor and the adjacent parts of the stator at the discharge end of the low-speed turbine 30 are shown. Passages for the compressed air through the thin-walled rotary turbine blades 52' communicate with the rotor disc air supply passages 50' turning from an axial direction to a radial direction, as shown in FIGURES 3 and 7, to lead into the passages through the blades 52', as shown in FIGURE 6. The adjacent portion of the stator is formed as a grid of circumferential dividers 56' and axial dividers 49', shown best in FIGURE 5 and in detail in FIGURES 6 and 7. As the rotor turns, the compressed air supplied through the turbine rotor passages 50' is accelerated by centrifugal force as it moves through the hollow blades and is discharged between the axially extending dividers 49'. These dividers are curved, as shown in FIGURES 5 and 6, to direct the flow of the air from circumferential to radial with the least disturbance.

The circumferential dividers 56', as shown in FIGURES 3 and 7, separate the flows of compressed air passing through the passages of the rotary turbine blades 52' and the stationary turbine blades 52'. Although the passages through both types of blades are supplied with compressed air by the turbine rotor passages 50', the flow of air through the rotary blades will be accelerated by centrifugal force as the turbine rotor rotates as mentioned above. As such air continues to move at higher velocities through the passages in the stator between dividers 56', such flow will have an aspirating effect on the adjacent passages of the grid through which air from the stationary turbine blade passages is discharged. Consequently by such aspirating effect the flow of air through the interior of the stationary blades will also be accelerated.

The action of the air flowing through the interior of the rotary turbine blades 43' of the high-speed turbine 31 from the hollow 42' of the rotor disc will be accelerated in the same manner, but to a greater extent because of the higher speed of the turbine rotor. In the same way such airflow will therefore accelerate the flow of air through the stationary turbine blades 40' of the turbine 31 by the aspirating effect of the air flowing through the rotary blades 43'. Also the higher speed at which the air is discharged through the passages from the turbine 31 will tend to accelerate to some extent the entire movement of the air through the conduit 32 to the combustion chamber 33 including the flow of air discharged from the turbine 30.

Figure 13:
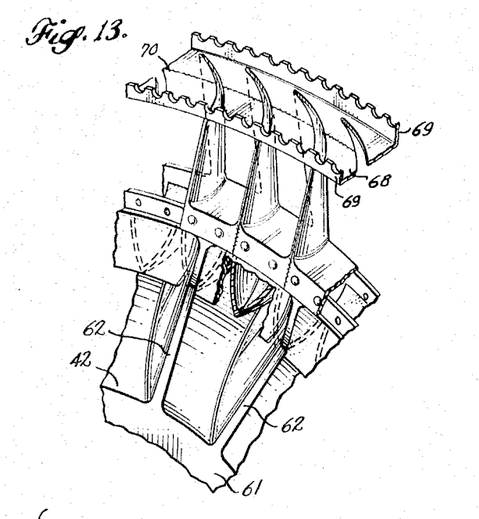
FIGURE 13 is a top perspective of a portion of a turbine rotor, with its parts broken away to some extent.
Figure 14:
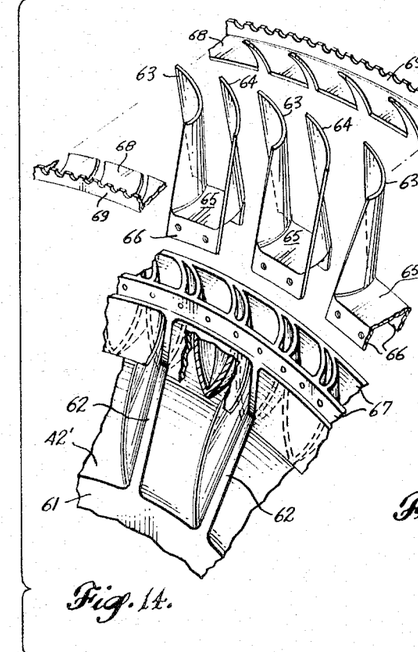
FIGURE 14 is a top perspective of such turbine rotor structure with parts shown in exploded relationship, a wall being broken out.
Figure 15:
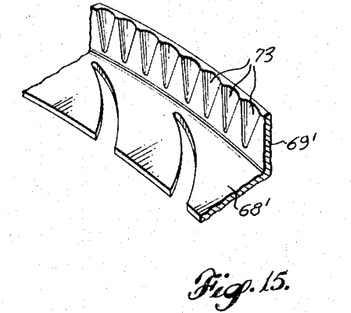
FIGURE 15 is a top perspective of a fragment of one component of the turbine rotor showing an alernative form.

It will be understood that in order to provide a rapid and efficient transfer of heat from the combustion gas to the compressed air flowing through the hollow turbine blades it is desirable for such blades to be made of material which conducts heat readily and which is capable of being used to construct turbine blades having thin walls. It is also desirable to provide a turbine blade construction which is hollow, yet which is economical to manufacture. The walls of the turbine blades will therefore be made of sheet material, and preferably of metal having high heat conducting ability. In FIGURES 13, 14 and 15 a preferred type of turbine rotor structure having hollow rotating blades is illustrated. The various parts of this construction can be cut and bent to shape from flat metal sheets, or they can be cast or forged in the desired shape with or without internal ribs.

The turbine wheel 61, shown in FIGURES 13 and 14 which may be of the same general type of structure for either turbine 30 or turbine 31, is cast or forged to provide a central massive hub portion from which the vanes 62 extend radially outward to form between them the passages 42' through which air may flow first axially and then is forced by such vanes 62 radially to the hollow blades by the rotation of the rotor. The turbine blades are formed from deep channels of sheet material which, as mentioned above, can be bent, cast or forged into the desired shape. The sides 63 and 64 of these channels are curved in different degrees, and are twisted so that when the channel members are assembled with the concave side 63 of a channel member of sharper curvature disposed adjacent to the convex side of a channel member 64 of more gradual curvature, a passage of somewhat crescent shape in cross section will be formed through the interior of a hollow blade. The channel sides are supported in spaced relationship by the web portions 65 of the channel members which have inwardly projecting parallel flanges 66 on their opposite edges of a size and shape to fit peripheral flanges 67 of the turbine wheel.

The channel elements shown separately in FIGURE 14 can be assembled on the periphery of the turbine wheel as shown in FIGURE 13, utilizing welding to secure the flanges together. The abutting edges of the channel element sides can be welded together, as indicated in FIGURE 13. The outer ends of the turbine blades thus formed can be interconnected by a rim having a web 68 provided with apertures of a shape and located to match the outer ends of the passages through the turbine blades. Opposite edges of this rim have flanges 69 projecting outwardly, which stiffen the rim and may fit into grooves in the adjacent portion of the stator, as shown in FIGURE 7, to assist in sealing the rotor periphery. Such a rim can be formed in two parts, as shown in FIGURE 14, and these parts can be secured together by a welded seam 70 connecting their abutting edges as shown in FIGURE 13, and the ends of the turbine blades can abut the web 68 and be welded to it, or project into the apertures of the web and be welded to the web at its outer side.

The edge flanges 69 of the turbine rotor rim, shown as projecting into annular grooves of the stator in FIGURE 7, may have scalloped edges, as shown in FIGURES 13 and 14, which will impel outward air which would tend to flow from the grid passages between the dividers 46' and 49' or 56' and 49' toward the lower pressure region through which the combustion gas passes. The web 68 of the rotor rim prevents direct passage of compressed air to the path of combustion gas through the turbines, so that it would be necessary for air flowing into such path to pass under a skirt 71 of the stator and then over a flange 69 in order to reach the combustion gas path. During such passage the projections of the scalloped rim flanges 69 would impel such compressed air to flow back into the openings of the grid through ports 72 provided through the dividers 56' at the bases of the skirts 71 as shown in FIGURES 6 and 7.

In FIGURE 15 an alternative type of rim section is shown in which the flanges 69' projecting outwardly from the web 68', instead of having scalloped edges, have inwardly tapered flutes 73 in them, and such edge flanges are shown in FIGURE 7. The function of such fluted flanges is the same as the function of the scalloped flanges shown in FIGURE 13. The impelling action of such fluted or scalloped flanges tends to return to ducts 72 any compressed air which may leak under the skirts 71 of dividers 56' to reduce as far as possible leakage of air around the flanges 69 or 69' and into the path of combustion gas flowing through the turbine. This same type of turbine rotor edge construction can be used for both of the turbines 30 and 31 in FIGURE 3, and for both of the turbines 3 and 4 in FIGURE 1, but is of more importance in the gas turbine of FIGURE 3 where the difference in pressure between the compressed air flowing through the turbine blades and the pressure of the combustion gas flowing through the turbine is greater. Such an impeller flange may also be provided on the turbine rim 69' in FIGURE 7 inwardly of blades 52' for the same purpose.

In FIGURE 7 an additional expedient is provided to reduce the leakage of compressed air from the stator grid passages past the outflow side of the rotor of turbine 30, where the difference in pressure between the compressed air flowing through the stator passages and the combustion gas flowing through the turbine is the greatest. Around the inner periphery of the stator, adjacent to the rotor, is an annular edge 74 forming an acute angle at a location spaced radially inwardly somewhat from the inner periphery of the rim 68. This edge serves as a flow divider deflecting a portion of the exhaust gas from its path of flow generally axially through the turbine to an outward flow between the rotor flange 69 and the adjacent base portion of divider 56'. The portion of the combustion gas thus deflected would flow in a direction opposite that of compressed air tending to leak past the flange 69, and would therefore deter such opposing flow of compressed air toward the combustion gas path.

Leakage of combustion gas from its path of flow axially through the turbine inwardly is deterred by providing interfitting annular projections and grooves on the rotor and stator inwardly of the bases of the turbine blades, designated 75 in FIGURE 7. Such interfitting ribs and grooves simply provide a tortuous path through which it is more difficult for combustion gas to escape. The smaller the clearance between such ribs and grooves the more effective the seal would be, of course, but ample clearance must be left between the ribs and grooves to prevent binding of these parts resulting from expansion of the parts caused by an increase in temperature of the turbine rotor or stator, or both.

Particularly in a gas turbine engine having plural compressors the effectiveness of cooling the turbines by use of air compressed by the turbines in course of its flow to the combustion chamber will be increased substantially if the air compressed by the first compressor is cooled before it is supplied to the next compressor. In FIGURE 3 such cooling action is shown as being accomplished by liquid coolant, which preferably is fuel burned in the combustion chamber 33, in somewhat the same way as described in connection with the turbine shown in FIGURE 1. Inwardly of the compressed air passage 13′ is the coolant container 14′, to which coolant is supplied and from which it is withdrawn to be cooled or to be used as fuel through connections 38. Ribs 15′ which may extend generally axially of the gas turbine engine and project inwardly from the wall separating the passage 13′ from the coolant container 14′ can be provided to increase the heat-transfer surface. Additional ribs or fins extending axially of the gas turbine engine may be supplied on the outer surface of this wall, if desired, to increase the surface through which heat from the compressed air is imparted to the wall.

In the gas turbine engine shown in FIGURE 1 the compressed air discharged from the compressor 1 is cooled only by coolant in the coolant container 14. Because of the compression of the air in the gas turbine engine of FIGURE 3 in two stages it is desirable to increase the cooling of the air between the discharge from compressor 28 and its inflow to compressor 29. For this purpose a cooling jacket 76 is provided around the outside of the compressed air passage 13′, and preferably the outer wall of such passage has fins 77 projecting outwardly from it substantially axially of the gas turbine engine into the coolant space 78 within the jacket 76. This jacket may also envelop the second-stage compressor 29 and even extend beyond it in a direction axially of the gas turbine engine, as shown in FIGURE 3. Coolant in the space 79 enveloping the high-pressure compressor will then have a cooling effect on the air being further compressed by such high-pressure compressor, and coolant in the additional space 80 may effect still further cooling on air passing through ducts 81 from the outlet of the compressor 29 to the passages 42′ and 50′ in the rotors of turbines 31 and 30.

Any suitable type of liquid coolant can be supplied to the annular coolant chamber 78, 79, 80, FIGURE 3, through a coolant supply top connection 82 shown at the left of this figure, and be withdrawn from such chamber through a bottom connection 83 shown at the lower left of this figure, as indicated by the arrows. The liquid coolant would be pumped through such chamber and to an external cooler by a suitable pump located in housing 84 and driven by gearing 85 from the shaft connecting the low-speed compressor driving turbine 30 and the compressor 28. If the coolant were fuel, part of such coolant would be sprayed by the nozzles 35 into the combustion chamber and the rest would be cooled and returned to the coolant chamber. The amount of coolant supplied to and withdrawn from the coolant container 14′ and the coolant chamber 78, 79, 80 will depend upon the degree of cooling desired. Also the cooling effect can be facilitated by provision of ribs on the passage 81 to increase the contact surface between the compressed air passages through which the air is discharged from the compressor 29 and the portion 80 of the coolant chamber.

Figure 8:
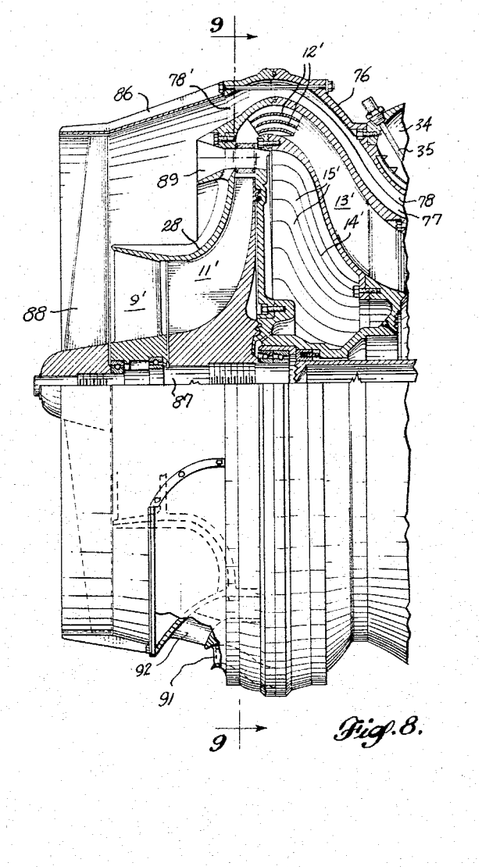
FIGURE 8 is a side elevation of the compressor section of a gas turbine engine showing an alternate type of construction, parts being broken away.
Figure 9:
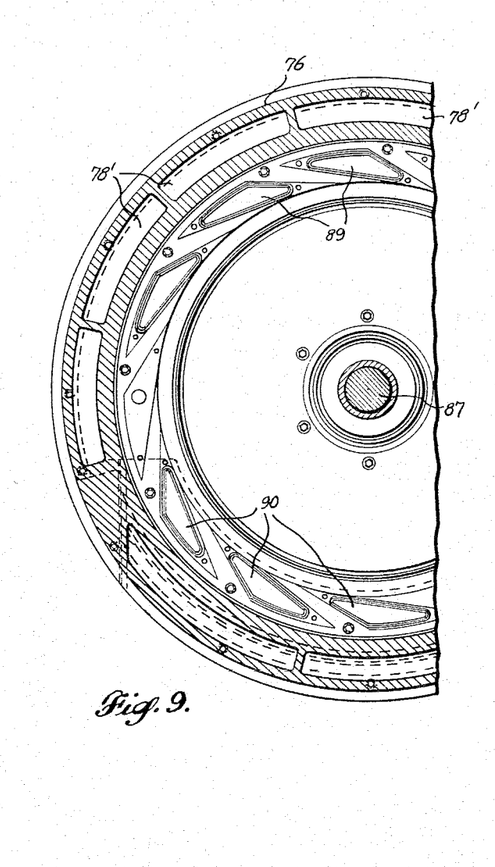
FIGURE 9 is a partial transverse section taken on line 9—9 of FIGURE 8.

While in the engines shown in FIGURES 1 and 3 liquid coolant is used for the purpose of cooling the compressed air discharged from the compressor or compressors, FIGURES 8, 9, 10 and 11 illustrate a gas turbine engine construction somewhat similar to that of FIGURE 3, but in which air is used as the coolant to cool the air compressed by the compressor or compressors. In FIGURES 8 and 9 a construction is shown in which air is used to cool the air compressed by a centrifugal compressor, and this type of construction can be used in conjunction with the centrifugal compressor 1 of FIGURE 1, or the centrifugal compressor 28 of FIGURE 3. Because of the similarity of the construction shown in FIGURES 8 and 9 to that of FIGURE 3 in various respects corresponding portions of the structure shown in FIGURES 8 and 9 have been numbered the same as in FIGURE 3, and these parts need not be described further. In this construction an air inlet shell 86 extends from the cooling jacket 76 axially beyond the compressor intake 9′ and spaced a substantial distance radially outward from such compressor inlet to form an annular air inlet passage of considerable size.

An extension 87 is provided on the shaft driving the centrifugal compressor impeller 11′ on which a cooling air propeller 88 is mounted, of a length substantially equal to the internal diameter of the shell 86. Rotation of this propeller will draw air both into the air intake of the centrifugal compressor 28 to increase its efficiency and into the shell 86 for cooling purposes. From the outer portion of the shell 86 such cooling air can flow directly to the coolant chamber 78 through the openings 78′ shown in FIGURES 8 and 9. Such air will flow from the chamber 78 back to and through the chamber 79 shown in FIGURE 10, which is connected to the chamber 78 as shown in FIGURE 3.

Figure 10:
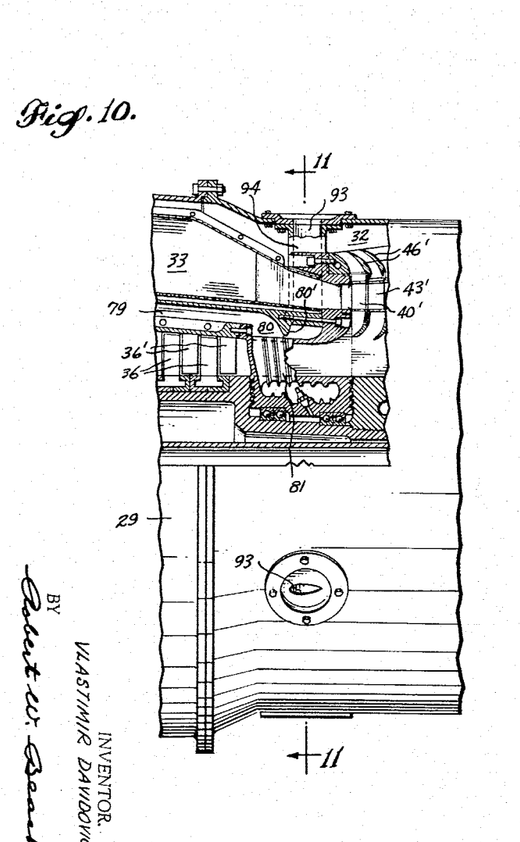
Figure 11:
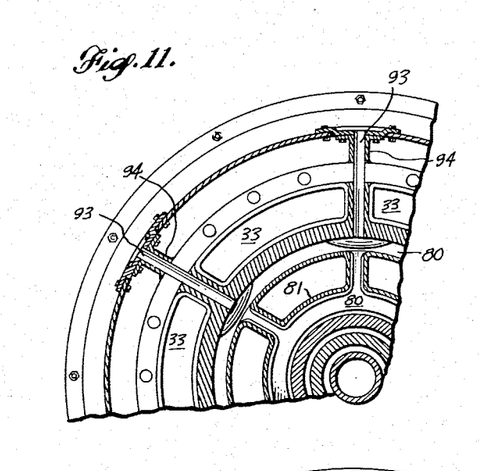
FIGURE 11 is a partial transverse section through such gas turbine on line 11—11 of FIGURE 10.

Cooling air supplied to the coolant chamber 78 from the cooling air inlet shell 86 will effect initial cooling of the air being compressed by the compressor 29 as it passes through the chamber 79, shown in FIGURE 10. In the coolant chamber 80 the air will additionally cool the air compressed by compressor 29 flowing through the passages 81, which are provided with radiating ribs, as shown in FIGURE 10. The cooling air can then flow to and be discharged from the bottom passage 91 shown in FIGURE 8 which is suitably connected to the coolant chamber 80.

Alternatively such air may be deflected by inward projections 80′ from passage 80 to flow inward completely around the compressed air ducts 81, FIGURES 4 and 10, for discharge to the atmosphere through radial passages 93 in struts 94. The amount of cooling air flowing through the coolant container 14′ and in the coolant chambers 78, 79 and 80 will, of course, depend upon the design and speed of rotation of the propeller 88. The cooling air entering the passages 78′ will be heated progressively as it moves through the coolant chambers 78, 79 and 80, but the cooling effectiveness of such air will be largely maintained because, as mentioned above, the temperature of the compressed air discharged from the high-pressure compressor 29 will be greater than the temperature of the air discharged from the low-pressure compressor 28.

Cooling air is used as the coolant in the inner coolant container 14′ in this instance as well as in the outer coolant chamber instead of using liquid coolant. Cooling air is supplied to the coolant container 14′ from the inlet shell 86 through passages 89 extending axially between diffusers arranged around the compressor discharge, as shown best in FIGURES 8 and 9. Air is discharged from the coolant container 14′ through passages 90 at the side of the gas turbine opposite the air inlet passages 89, and these passages discharge through a bottom outlet 92 shown in FIGURE 8, which is separated by a partition from the outlet opening 91 of the outer coolant passage. The propeller 88 will therefore effect a continual flow of cooling air into the coolant container 14′ through the inlet openings 89 and such air will be discharged through the outlet openings 90 and discharge duct 92 after being heated by heat transferred to such air through the walls of the coolant container and fins 15' from the compressed air in passage 13'.

If greater cooling effect should be desired for the single compressor gas turbine engine of FIGURE 1, both sides of the passage 13 can be cooled, either by liquid coolant as shown in FIGURE 3, or by cooling air as shown in FIGURE 8. Such greater cooling effect may be desirable in order to be able to use less expensive material for the turbine blades, which is reliably strong enough only at quite low temperatures. The turbine wheel materials are also stronger at such lower temperatures.

By use of the construction described above both the stationary and rotating turbine blades can be cooled effectively by air compressed by a turbine-driven compressor or compressors with minimum loss of such air to the combustion gas flowing through the turbine. Instead, virtually all the air used for cooling purposes which has been compressed will be delivered to the combustion chamber.

Gas turbine engines utilizing the turbine blade cooling construction described above have thermodynamic advantages over conventional gas turbine engines, as follows:

(1) Because the total quantity of air delivered by the compressor or compressors is available for cooling the stationary blades and rotary blades of the turbines, combustion gas having exceptionally high turbine inlet temperature can be used.

(2) The useful temperature drop of the combustion gas flowing through the turbines can be increased in two ways:

(a) By increasing the initial temperature of the combustion gas supplied to the turbines;

(b) By decreasing the temperature of the combustion gas discharged from the turbines after expansion.

(3) By conserving the heat removed from the combustion gas by the cooling air in using such preheated air in the combustion chamber, resulting in less fuel being required to attain the desired turbine inlet temperature.

(4) By amply cooling the stationary and rotary turbine blades the temperature drop of the combustion gas passing each row of turbine blades is increased, so that a given total temperature drop of the combustion gas through the turbine can be obtained by passing the combustion gas through a fewer number of turbine stages than would be required if the turbine blades were not cooled.

(5) By heating combustion air in passing it through the hollow turbine blades, a greater heat exchange efficiency is obtained than is possible by the use of a heat exchanger located at the discharge side of the turbines, because (a) The resistance to flow of both the combustion gas and the compressed air is less for such air passing through the turbine blades than through such a heat exchanger;

(b) The rotation of the turbine rotor accelerates movement of the cooling air through the passages of both the stationary and the rotary blades, and the air passing through the rotary blades further produces an aspirating effect on the cooling air passing through the stationary turbine blades;

(c) The difference in temperature between the combustion gas and the cooling air is greater at the inlet to the turbines than at the discharge side of the turbines;

(d) The high velocity of the combustion gas adjacent to the inlet of the turbines and the higher velocity of the air going through the hollow blades increases the heat exchange effectiveness.

(6) The advantage of utilizing regenerative turbine blade cooling is not reduced even if materials capable of withstanding much higher temperatures are used, because the blade cooling will simply enable combustion gas having a much higher temperature to be supplied to the turbine inlet, thus increasing the efficiency of the gas turbine operation.

(7) The higher operating efficiency is obtained by cooling the turbine blades by use of a construction which is light and compact, and which is suitable for use in gas turbine engines employed either in stationary installations or for vehicle propulsion, including aircraft propulsion.

While, as stated above, cooling of the turbine blades provides a more efficicient transfer of heat between the combustion gas and the combustion air, it may be desirable to cool further the combustion gas by use of a heat exchanger at the discharge side of the turbines. A heat exchanger for this purpose is shown in the exhaust manifold downstream from the second turbine in FIGURE 1. Cooling air supplied to the casing 18 through the pipe 16 can flow not only into the passages 50 in the rotor 4, but also through tubes 95 extending radially through the exhaust gas manifold from the compressed air manifold 18 to the annular passage 20 encircling the turbines. While two annular rows of such tubes are shown with the tubes of each row offset circumferentially relative to the tubes of the other row, it will be understood that a larger number of rows of tubes can be utilized if desired.

Figure 16:
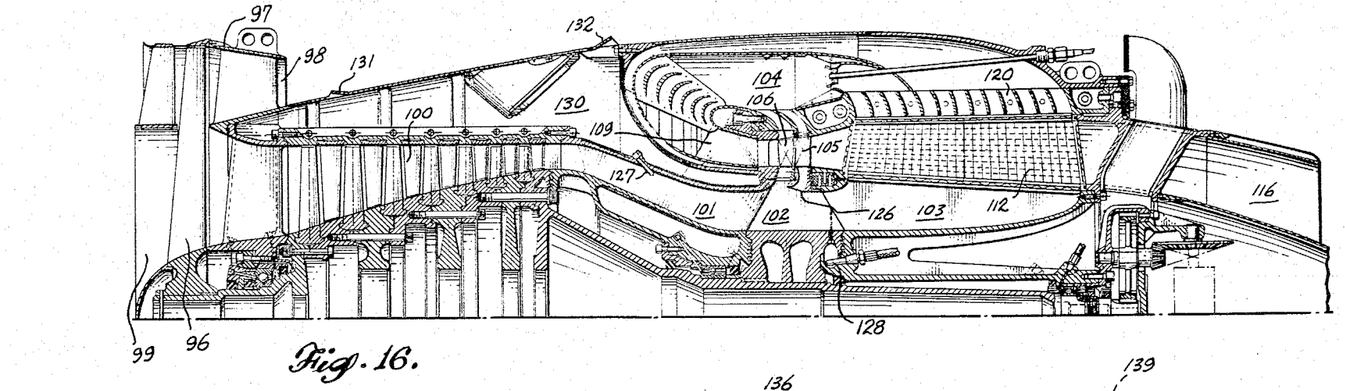
FIGURE 16 is a longitudinal section through a modified type of axial compressor gas turbine jet engine.
Figure 17:
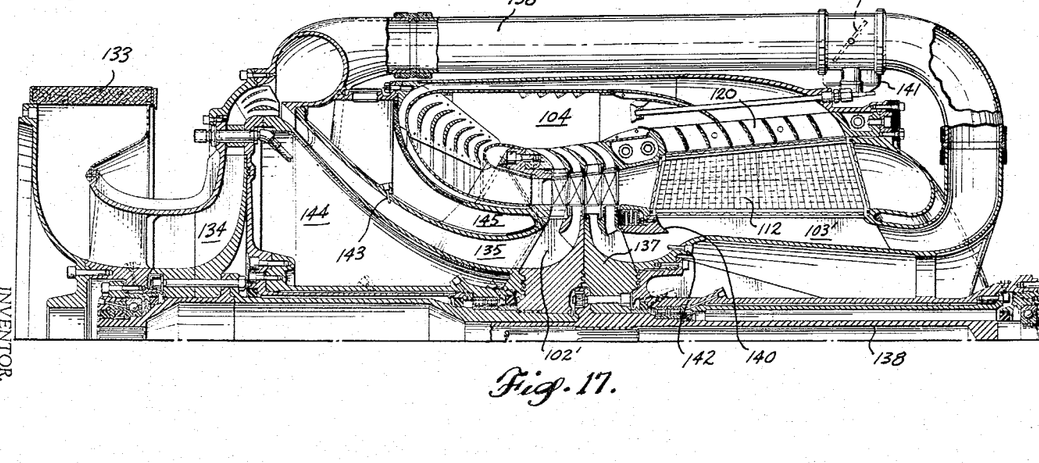
FIGURE 17 is an axial section through one-half of a further type of centrifugal compressor gas turbine engine with a power drive shaft.

In FIGURES 16 and 17 gas turbine engines having much larger heat exchangers at the discharge side of the turbines are shown. Moreover, the type of heat exchanger used can be of plate construction, as shown in these figures, instead of being of tubular construction, as shown in FIGURE 1. Such plate type of heat exchanger provides a much greater heat exchanger gas contact area for a comparable space occupied by the heat exchanger and reduces the resistance to flow of both air and gas through the heat exchanger. Moreover, the heat exchanger can be of counterflow type instead of cross-flow type, if desired. Such heat exchangers can be made in sections to facilitate insertion or removal of sections.

The gas turbine engine shown in FIGURE 16 is intended primarily for use in propelling aircraft and includes a fan 96 rotatable within a duct 97, which propels air through an annular passage 98 to increase the thrust of the engine and, in addition, accelerates the flow of air through passage 99 into the axial compressor 100. A gas turbine engine of this type is intended to operate under conditions of low or moderate pressure ratio and high temperature. It is therefore advantageous to provide the fan 96, which increases the speed of the air entering opening 99 leading to the compressor to a velocity higher than that of the aircraft. Air compressed by the compressor 100 travels through passage 101 to the interior of the turbine rotor 102, and part of the air compressed by the compressor travels on into the annular chamber 103.

As has been discussed in connection with other embodiments of the present invention, a very important feature is to utilize air compressed by the compressor to cool the turbine blades instead of supplying such compressed air directly to the combustion chamber or chambers 104. The turbine rotor carries hollow rotary blades 105 shown best in the enlarged detail of FIGURE 20. These blades cooperate with the stationary hollow turbine blades 106 in the usual manner. From the hollow interior of the turbine rotor 102 compressed air can pass into the hollow turbine blades 105 through passages 107. The hollow interior of the turbine rotor also has openings which communicate radially with passages 108, which are in radial registry with the passages through the hollow stationary blades 106.

The air compressed by the axial compressor 100 and passing into the hollow turbine rotor 102, despite heating of such air effected by such compression, is at a temperature much lower than that of the combustion gas supplied through passage 109 to the turbine from the combustion chamber 104. Consequently the air flowing through both the stationary and rotary hollow blades cools the material of the blades and keeps their temperature much below the temperature of the combustion gas flowing in contact with the external surfaces of such hollow blades. Such contact of the combustion gas with the exterior of the blades extracts heat from the combustion gas and such heat conducted through the blade walls is in turn extracted from the blades by the cooling air flowing through them, which increases the temperature of such air.

The compressed air heated by passage through the interior of the rotating blades 105 flows through passages 110 into the combustion chamber 104, and compressed air heated by passage through the interior of the stationary blades 106 flows through passages 111 into the combustion chamber. Such flow of air through passages 110 is accelerated by the centrifugal force acting on such air as a result of the rotation of the rotary turbine blades 105. Flow of air through passages 111 connected to the stationary turbine blades 106 is effected by the pressure of the compressed air, the centrifugal effect of the rotating turbine rotor 102 blowing the air into passages 108 and thence into the stationary blade passages 106, and the aspirating effect on the air in passages 111 leading from the stationary blade passages 106 by the air flowing through passages 110 accelerated by the action of the rotary blades 105.

Figures 18, 19:
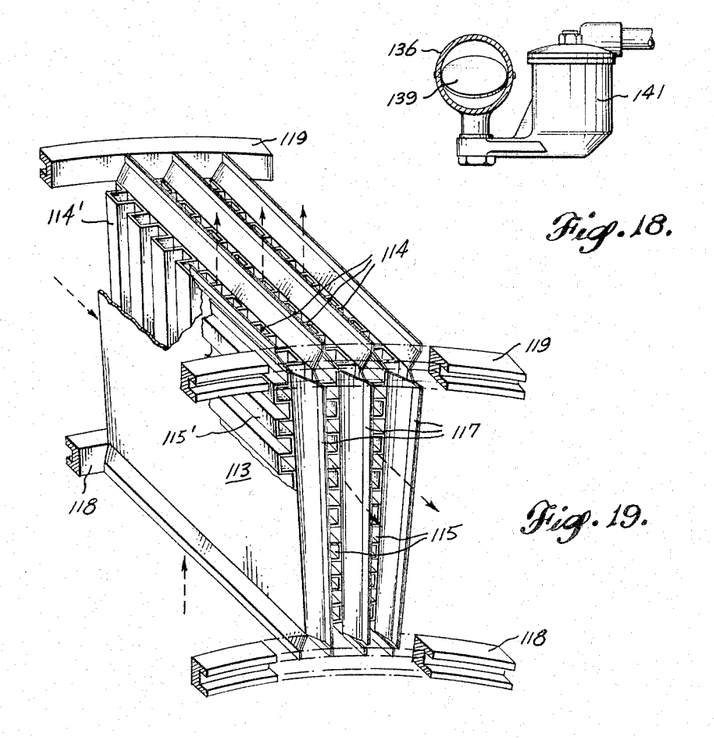
FIGURE 18 is a detail elevation of a carburetor installation used with this type of gas turbine engine.
FIGURE 19 is a top perspective of a portion of a heat exchanger of the type used in the gas turbine engines shown in FIGURES 16 and 17, having parts broken away.

Air which passes axially through the hollow interior of turbine rotor 102 into the chamber 103 will flow radially outward through heat exchanger 112 to effect further cooling of combustion gas discharged from the turbine portion of the exhaust duct. In the preferred type of heat exchanger shown in detail in FIGURE 19 plates 113 are spaced apart to form radial passages 114 by convoluted spacers 114' between them, through which the cooling air flows. Intermediate passages 115 formed between the opposite sides of such plates in an axial direction by convoluted spacers 115' afford passage for flow of combustion exhaust gas from the turbine section to the tail pipe 116. As shown in FIGURE 19, the axially extending plate edge portions at the radially outer and inner edges of the blades are bent toward each other into contact and sealed to close the radially outer and inner edges of the groups of exhaust gas passages 115. Similarly the radial edge portions 117 of the plates 113 are bent into contact and sealed so as to close the radial edges of the groups of cooling air passages 114, while leaving open the axial ends of the alternate spaces for the axially directed exhaust gas passages 115.

The heat exchanger thus formed of plates 113 is of annular shape and is supported by inner rings 118 and outer rings 119 at opposite ends of the heat exchanger. Radially outwardly of the heat exchanger the grid 120, of construction generally similar to the grid 49', 56' shown in FIGURE 5, encircles the heat exchanger. Preferably this grid extends axially from a location forward of the stationary blades 106 to a location aft of the heat exchanger 112. The components of such grid are sufficiently strong to provide adequate structural support for the gas turbine engine structure with minimum interference with flow of the compressed air through the turbine discharge passages 110 and 111, and the heat exchanger discharge passages 114. As shown in FIGURE 16 the passages through that portion of the grid radially outward from the heat exchanger are curved so that air discharged from the heat exchanger is deflected toward the combustion chamber 104.

Figure 20:
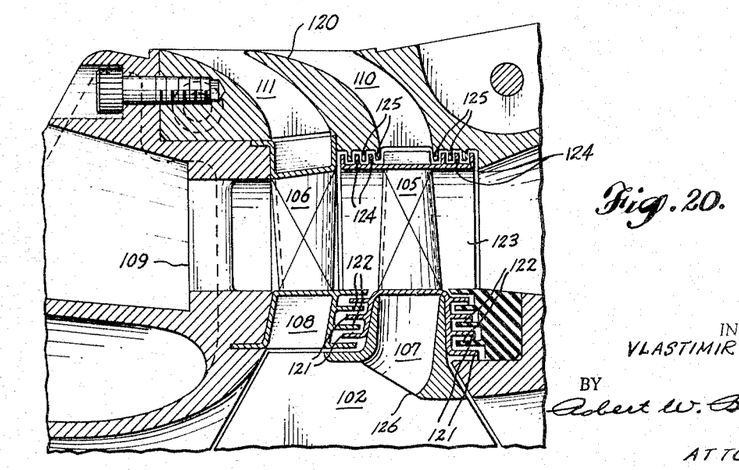
FIGURE 20 is a fragmentary detail section on an enlarged scale of sealing mechanism which may be used in the gas turbine engines shown in FIGURES 16 and 17.

In order to reduce leakage of compressed air from the interior of the turbine rotor 102 axially extending flanges 121 can be provided around the base of the rotary blades 105, as shown in FIGURE 20, which are interdigitated with annular flanges 122 extending oppositely from the adjacent portions of the stationary engine structure. Such interfitting annular flanges provide a labyrinthine passage which deters flow of compressed air radially outward from the hollow interior of the turbine rotor. Encircling the hollow blades 105 is an axially extending outer ring 123. From this ring ribs 124 project radially outward and are interdigitated with stationary ribs 125 projecting radially inward from the adjacent stationary portion of the gas turbine engine. Such interfitted ribs 124 and 125 also form a labyrinthine passage deterring escape of compressed air from the passages 110 to the exhaust gas flowing through the turbine.

To deflect the desired quantity of compressed air into the passages 107 supplying cooling air to the interior of blades 105 an annular wedge 126, shown best in FIGURE 20, is provided to divide the axial flow of air passing through the rotor. The extent to which this wedge projects into the cavity of the rotor affects the amount of air which is deflected from such axial flow into the passages 107 and 108, to travel through the hollow turbine blades. The portion of the compressed airflow which is not deflected through these passages continues into the chamber 103 from which it flows into the heat exchanger 112. Thus, the entire body of air compressed by the compressor 100 passes into the combustion chamber, or chambers, 104 by way of either the hollow turbine blades or the heat exchanger, so that all of such compressed air is utilized to cool the exhaust gas discharged from the combustion chamber, or chambers.

The cooling action of the compressed air on the turbine blades can be supplemented, if desired, by injecting liquid coolant into the passage 101 through one or more nozzles 127 in atomized form. Such liquid coolant suspended in the compressed air is carried into the chamber in the central portion of turbine rotor 102. Additional liquid coolant can be supplied to the air passing beyond the dividing wedge 126 by nozzles 128 ejecting coolant into the aft portion of the rotor chamber. Such nozzles can be used additionally, or alternatively, to inject a detergent liquid into the turbine rotor central chamber for flow through passages 107 and 108, and the hollow blades 105 and 106 for cleaning the blade passages.

To increase the compressing ability of the axial compressor 100 it may be desirable to cool the air being compressed during its passage through the compressor. For this purpose cooling air can be passed through the chamber 130 encircling the compressor 100. Such cooling air can be supplied to such chamber through entrance louvers 131 located behind the duct 98 to receive from it air accelerated by the fan 96. From the compartment 130 air is discharged through the exhaust louvers 132, which open rearwardly so that suction will be produced in them by the flow of air over the exterior of the gas turbine housing. It will be noted that this airflow acts primarily to cool air during its passage through the compressor, and not the air in the compressor outlet.

In FIGURE 17 a type of gas turbine is shown which is more particularly adapted for stationary, marine, automotive or propellor-driven aircraft use. This type of gas turbine is intended to operate at low, or medium, compressor pressures and high temperature. Air drawn through the filter 133 by suction from the centrifugal compressor 134 passes through the annular passage 135 to a hollow chamber in the turbine rotor 102'. At one or more locations around the annulus of the passage 135 compressed air can be bled into the bypass duct 136, or ducts, through which air is supplied to the rearward end of an aft annular chamber 103'. In this engine construction the compressor 134 is driven by the forward turbine 102', and a second turbine having a rotor 137 drives the power takeoff shaft 138. Such shaft may be used to drive a vehicle, a marine propeller, an electricity generating plant or other type of machinery drive.

In the engine of FIGURE 17 provision is made for cooling both the rotating and stationary blades of both turbines 102' and 137. The hollow blades of the turbine 102' are supplied with cooling air in the same manner as air is supplied to the blades 105 and 106 of the gas turbine engine shown in FIGURE 16, as explained previously. In this instance, however, all of the air passing through passage 135 must flow to the combustion chamber 104 thorugh the blades of turbine 102'. Air is supplied to the blades of turbine 137 from passage, or passages, 136 by way of chamber 103'. The chamber in the rotor 137 receives all of the air discharged from the forward end of compartment 103', and such air flows through the hollow rotary and stationary blades of this turbine in the same manner as described in connection with FIGURE 20. The cooling air discharged from the blade passages enters the combustion chamber 104. The additional air supplied to compartment 103' flows through the heat exchanger 112 and the grid 120 into the combustion chamber 104.

In the gas turbine engine of FIGURE 17, therefore, as well as that of FIGURE 16, all of the air compressed by the air compressor 134 passes to the combustion chamber, or chambers, 104 through either cooling passages in the turbine blades or the heat exchanger 112. The proportion of the compressed air bled from the compressor to pass through bypass duct 136 can be altered by adjustment of the butterfly control valve 139 in the duct, or ducts, 136. Also, the amount of air supplied to chamber 103' through the duct, or ducts, 136 can be divided for flow through the heat exchanger, or through the cavity of turbine rotor 137 by the annular wedge surface 140, shown in FIGURE 17. The air passing through the heat exchanger 112, which may be of a construction like that shown in FIGURE 19, will further reduce the temperature of the exhaust gas discharged from the two turbines 102' and 137.

While substantial cooling of the exhaust gas can be effected simply by cooling air passing through the hollow turbine blades and the heat exchanger 112, greater cooling of the exhaust gas can be accomplished by humidifying the compressed cooling air or by using such cooling air as a vehicle for a liquid coolant. The cooling air passing from a duct 136 into the annular aft chamber 103' of the gas turbine engine can be humidified by supplying coolant to the duct 136 from a carburetor 141. Such carburetor can be connected to the duct 136 at the location of the control valve 139, as shown in FIGURES 17 and 18. Such coolant can be chemical coolant or water.

In addition, supplemental coolant can be sprayed into the air used for cooling the turbine blades and such coolant preferably is supplied to the air at a location adjacent to the turbine or turbines. A nozzle or nozzles 142 directed into the passage through which air flows to the interior of turbine rotor 137 can supply such coolant to the power turbine and nozzles 143 can supply coolant to the annular passage 135 through which air flows to the rotor chamber of the compressor-driving turbine 102'. These nozzles 142 and 143 can also be used for ejecting detergent into the passages leading to the hollow turbine blades for cleaning the interior of such blades. The supplemental coolant is injected to obtain precise isentropic cooling where the flow dividing wedges 140 or 126 do not divide the flow in exactly correct proportions.

For very high turbine inlet temperatures where use of air alone is incapable of providing sufficient cooling, particularly for the first turbine, and perhaps also for the second turbine, a large amount of coolant can be supplied to the cooling air by injection nozzles. Coolant liquid can, for example, be injected into the cooling airstream flowing to the first turbine through passage 135 by nozzles 143. Additionally, if supplemental cooling of the second turbine is required coolant liquid can be supplied to the cooling airstream flowing through conduit 136 by nozzles 142. As much coolant can thus be sprayed into the cooling air as may be desired without adversely affecting the combustion in the combustion chamber 104, even if the coolant used is water.

It will be noted that the fuel is injected into the right end of the combustion chamber as seen in FIGURE 17, and air flowing through the heat exchanger 112 enters the same end of the combustion chamber behind the fuel supply nozzle so as to serve as the primary air for supporting combustion. The cooling air passing through the hollow turbine blades is deflected to the left by the grill work located immediately outwardly of the turbine rotors, as shown in FIGURE 17, so that such air laden with moisture enters the left end of the combustion chamber 104 to constitute secondary air. Such moisture-laden secondary air can be utilized effectively in the combustion process when the combustion has been initiated to a vigorous burning condition by the use of air flowing only through the heat exchanger, which has a comparatively small moisture content.

Where a large quantity of water is supplied to the air used for cooling, such as under the conditions discussed above, it may be desirable to cool the combustion gas after it has been discharged from the passages 115 of the heat exchanger so as to condense water from the combustion gas and recover it for reuse.

If it is desired to cool the rear wall of the compressor 134, liquid coolant can be supplied to the chamber 144. In addition, temperatures of the gas turbine engine at the inlet to the power turbine can be reduced or controlled by circulating liquid coolant through the chamber 145.

While representative forms of gas turbines embodying the invention have been illustrated, it will be understood that the principles of the invention are applicable to different types of gas turbine constructions, and that such principles may be utilized in various types of applications within the spirit of the invention as defined in the appended claims.

I claim:

1. A gas turbine engine comprising turbine means including cooperating hollow stationary blades and hollow rotary blades disposed in adjacent relationship, a combustion chamber supplying combustion gas to said turbine means, compressor means, passage means conducting air compressed by said compressor means to and radially outward through said adjacent stationary and rotary hollow blades of said turbine means, and passage means including portions receiving compressed air from said hollow rotary blades in positions adjacent to portions receiving air from said hollow stationary blades so that air passing through said passage means portions from said hollow rotary blades produces an aspirating effect on the air in said passage means portions receiving air from said hollow stationary blades and thence conducting the air from both said hollow rotary blades and said hollow stationary blades to said combustion chamber.

2. A gas turbine engine comprising turbine means including cooperating hollow stationary blades and a rotor having hollow rotary blades disposed in adjacent relationship to said hollow stationary blades, a combustion chamber supplying combustion gas to said turbine means, compressor means, passage means conducting air compressed by said compressor means to said rotor and radially outward therefrom through said adjacent stationary and rotary hollow blades of said turbine means, rotation of said rotor impelling such compressed air outward into said hollow stationary blades, and passage means including portions receiving compressed air from said hollow rotary blades in positions adjacent to portions receiving air from said hollow stationary blades so that air passing through said passage means portions from said hollow rotary blades produces an aspirating effect on the air in said passage means portions receiving air from said hollow stationary blades and thence conducting the air from both said hollow rotary blades and said hollow stationary blades to said combustion chamber.

3. A gas turbine engine comprising compressor means, a combustion chamber, and turbine means receiving combustion gas from said combustion chamber and including a rotor having a hollow hub portion containing a first set and a second set of axially-separate radially-extending openings therein receiving air under pressure, stationary blades overlapping a portion of said rotor's hollow hub portion, extending radially outward therefrom and having passages extending generally radially therethrough with their inner ends in communication with said first set of rotor hub openings and their outer ends in communication with said combustion chamber, and said rotor having rotary blades projecting outward therefrom alongside said stationary blades with passages extending generally radially therethrough having their inner ends in communication with said second set of rotor hub openings and their outer ends in communication with said combustion chamber.

4. The gas turbine engine defined in claim 3, and a heat exchanger having one set of passages receiving combustion chamber exhaust gas from the turbine and a second set of passages separated from but in heat exchange relationship to said first set of passages, each passage in said second set having one end communicating with the hollow rotor and its other end communicating with the combustion chamber, for flow of air from the hollow rotor through the heat exchanger to the combustion chamber in parallel with flow of air through the rotary and stationary turbine blades.

5. The gas turbine engine defined in claim 3, including conduit means receiving substantially the entire output of the compressor means and connected to the hollow of the hollow rotor hub portion to deliver substantially the entire output of said compressor means to such hollow.

6. A gas turbine engine comprising compressor means, a combustion chamber, a compressor-driving turbine connected to drive said compressor means, driven by combustion gas from said combustion chamber and including a rotor having a hollow hub portion with a side adjacent to said compressor means receiving air under pressure therefrom, stationary blades overlapping a portion of said rotor's hollow hub portion, extending radially outward therefrom and having passages extending generally radially therethrough with their inner ends communicating with the hollow of said hub portion and their outer ends communicating with said combustion chamber, and said rotor having rotary blades projecting outward therefrom alongside said stationary blades with passages extending generally radially therethrough having their inner ends in communication with the hollow of said rotor hub portion and their outer ends in communication with said combustion chamber, and a second turbine disposed alongside said first turbine at the side thereof remote from said compressor means and including a rotor having a hollow hub portion, stationary blades overlapping a portion of said second turbine rotor's hollow hub portion extending radially outward therefrom and having passages extending generally radially therethrough with their inner ends communicating with the hollow of said hub portion and their outer ends communicating with said combustion chamber, and said second turbine rotor having rotary blades projecting outward therefrom alongside said stationary blades with passages extending generally radially therethrough having their inner ends in communication with the hollow of said second turbine rotor hub portion and their outer ends in communication with said combustion chamber, and passage means conducting air from said compressor means to the side of said second turbine rotor remote from said first turbine and communicating with the hollow thereof.

References Cited by the Examiner
UNITED STATES PATENTS

| | | | |
|---|---|---|---|
| 2,445,973 | 7/1948 | Sawyer | 60—39.16 X |
| 2,595,505 | 5/1952 | Bachle | 60—39.36 |
| 2,611,242 | 9/1952 | Bell | 60—39.57 |
| 2,618,120 | 11/1952 | Papini | 60—39.66 X |
| 2,625,794 | 1/1953 | Williams et al. | 60—39.65 |
| 2,640,319 | 6/1953 | Wislicenus | 60—39.66 |
| 2,647,368 | 8/1953 | Triebbnigg et al. | 60—39.66 X |
| 2,743,579 | 5/1956 | Gaubatz | 60—39.66 X |
| 2,852,912 | 9/1958 | Kelley | 60—39.16 |
| 2,940,257 | 6/1960 | Eckert et al. | 60—39.66 |
| 2,940,258 | 6/1960 | Lombard et al. | 60—39.66 |
| 2,942,413 | 6/1960 | Corbett | 60—39.66 X |
| 3,034,298 | 5/1962 | White | 60—39.66 |
| 3,051,438 | 8/1962 | Roberts et al. | 253—39.15 |
| 3,094,310 | 6/1963 | Bowmer | 253—39.15 |

FOREIGN PATENTS 945,798   7/1956   Germany.

JULIUS E. WEST, *Primary Examiner.*